United States Patent
Tsypliaev et al.

(10) Patent No.: US 8,725,821 B1
(45) Date of Patent: May 13, 2014

(54) SYSTEM AND METHOD FOR PROJECT AND PROCESS MANAGEMENT BY SYNCHRONIZING CUSTOM OBJECTS BETWEEN MS OUTLOOK AND EXTERNAL SERVER

(75) Inventors: Maxim V. Tsypliaev, Moscow (RU); Peter E. Volynskiy, Moscow (RU); Dennis S. Dyatlov, Moscow (RU); Konstantin N. Bredyuk, Moscow (RU)

(73) Assignee: Comindware Ltd., Tortola (VG)

( * ) Notice: Subject to any disclaimer, the term of this patent is extended or adjusted under 35 U.S.C. 154(b) by 113 days.

(21) Appl. No.: 13/419,753

(22) Filed: Mar. 14, 2012

(51) Int. Cl.
*G06F 15/16* (2006.01)
*G06Q 10/10* (2012.01)

(52) U.S. Cl.
CPC .................................... *G06Q 10/107* (2013.01)
USPC .......................................................... 709/206

(58) Field of Classification Search
USPC .................. 709/203, 206; 707/610, 626, 656
See application file for complete search history.

(56) References Cited

U.S. PATENT DOCUMENTS

| 8,370,442 B2* | 2/2013 | Ahn et al. ..................... 709/206 |
| 2012/0130945 A1* | 5/2012 | I Dalfo et al. ................. 707/610 |
| 2013/0006926 A1* | 1/2013 | Erofeev ......................... 707/610 |
| 2013/0198132 A1* | 8/2013 | Khosravy et al. ............. 707/610 |

* cited by examiner

*Primary Examiner* — Ario Etienne
*Assistant Examiner* — Uzma Alam
(74) *Attorney, Agent, or Firm* — Bardmesser Law Group

(57) ABSTRACT

A method for data synchronization is provided. Custom Objects are stored in MICROSOFT Outlook as Outlook items. Two continual processes check if there are changes in the Outlook Items and whether these changes are saved on the hard drive. MICROSOFT Storage Items are used to store information about fields of Outlook items that have been changed and fields of Outlook items that have been saved to the hard drive. Then, information about both changed and saved fields is sent to an external server. Subsequently, notifications about successful saving of the fields on the external server are received. The information about the fields changed on the external server is received, as well. The fields changed on the external server are saved to the Outlook items. Thus, two-way synchronization between Outlook and the external server is achieved.

12 Claims, 9 Drawing Sheets

FIG. 6

FIG. 8

SYSTEM AND METHOD FOR PROJECT AND PROCESS MANAGEMENT BY SYNCHRONIZING CUSTOM OBJECTS BETWEEN MS OUTLOOK AND EXTERNAL SERVER

BACKGROUND OF THE INVENTION

1. Field of the Invention

The present invention is related to methods for data synchronization, and more particularly, to a system and method for synchronizing custom objects between MICROSOFT Outlook and similar email clients and an external server.

2. Description of the Related Art

MICROSOFT Outlook has become a primary mail application used by millions of users all over the world. MICROSOFT Outlook allows you to efficiently work with many business objects (and the custom objects, discussed below), such as mail, tasks, meetings, appointments, etc. However, MICROSOFT Outlook does not natively allow you to work with business objects that have advanced Workflow behind them (such as, e.g., Issues, Projects, Business Processes, Customer claims, Requests, etc). These Workflows are executed on an external server. Given the popularity of MICROSOFT Outlook as an email client, and the absence of native support for workflow-based business objects, it is desirable to be able support work with business objects with Workflow from within MICROSOFT Outlook interface (as well as from other standard email clients that do not normally support such functionality).

Therefore, there is a need in the art for a system and method for synchronizing data between MICROSOFT Outlook email clients and similar clients and an external server where it is stored in such a manner that the data is constantly updated.

SUMMARY OF THE INVENTION

The present invention is related to methods for data synchronization, and more particularly, to a system and method for synchronizing custom objects between MS Outlook and an external server, that substantially obviates one or several of the disadvantages of the related art.

In one aspect of the invention, a method for data synchronization is provided. Custom Objects are stored in MICROSOFT Outlook as Outlook Items. Two continuous processes check if there are changes in the Outlook Items and if these changes are saved on the persistent storage, such as hard disk drive. MICROSOFT Storage Items are used to store information about the fields of the Outlook Items that have been changed in RAM and fields of Outlook Items that have been saved to the persistent storage.

Then, information about both changed and saved fields is sent to an external server. Subsequently, notifications about successful saving of the fields on the external server are received. The information about the fields changed on the external server is received, as well. The fields changed on external server are saved to Outlook Items. Thus, two-way synchronization between MICROSOFT Outlook and the external server is achieved.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 6 illustrate a screenshot of history interface, in accordance with the exemplary embodiment;

FIG. 8 illustrates a screenshot of tasks interface, in accordance with the exemplary embodiment;

DETAILED DESCRIPTION OF THE PREFERRED EMBODIMENTS

Figure 1:
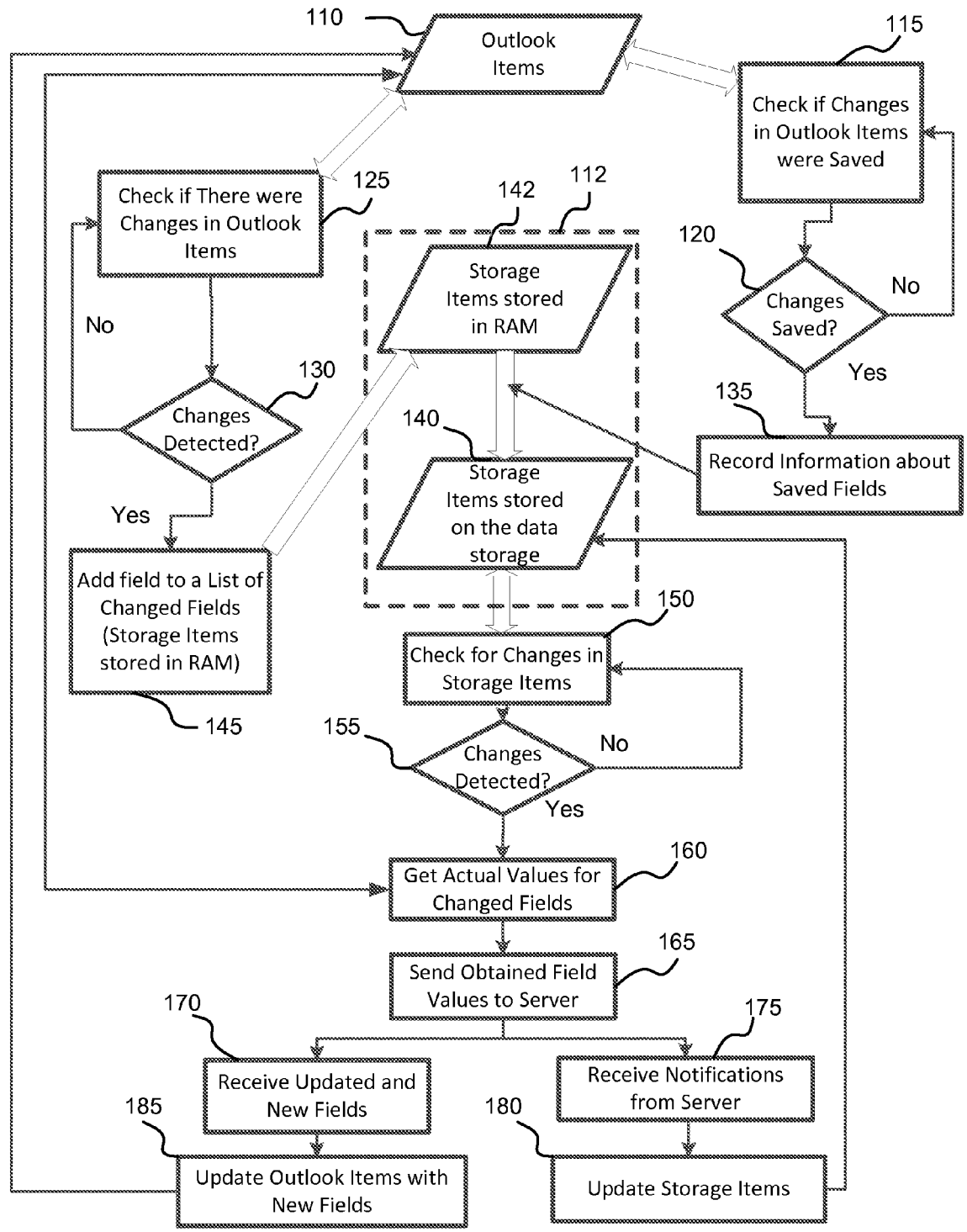
FIG. 1 illustrates a method for synchronizing custom objects between MS Outlook and an external server, in accordance with the exemplary embodiment.

Reference will now be made in detail to the preferred embodiments of the present invention, examples of which are illustrated in the accompanying drawings.

In this discussion, MICROSOFT Outlook 2010 is used as an example, although the invention contemplates the use of any email client application (mail user agent (MUA)) that allows to design custom interface and show the relevant data in it, such as a desktop application that is used to work with emails and such objects as Contacts, Tasks, Calendar, etc. It is possible to use particular email client for managing custom Items if it supports, as it was stated before, designing of custom forms and showing our data in it. MICROSOFT Outlook 2010 is used in the description as one example, since it is one of most popular email clients and satisfies requirements. Lotus Notes is another example, although the invention is not limited to any particular email client.

Custom Objects can be converted and saved to MICROSOFT Outlook as MICROSOFT Outlook Items, which can include data in a standard format of MICROSOFT Outlook (i.e., the format of the email client), and can include data in a custom format for storing an information, which can be visualized and processed by custom manager (discussed below). According to the exemplary embodiment, special processes continuously check if there are changes in the Outlook Items and whether these changes are saved on the persistent storage/data storage, for example, the hard disk dive. MICROSOFT Outlook Storage Items (112, FIG. 1) are used to store information about the fields of the MICROSOFT Outlook Items that have been changed in RAM (142, FIG. 1) and the fields of the MICROSOFT Outlook Items that have been saved to persistent storage (140, FIG. 1), such as hard disk drive.

The information reflecting both changed and saved fields is sent to an external server. Subsequently, notifications about successful saving of the fields on the external server are received. The information about the fields changed on the external server is received back, as well. The fields changed on the external server are saved to the MICROSOFT Outlook Items. Thus, two-way synchronization between MICROSOFT Outlook and the external server is achieved.

According to an exemplary embodiment, a synchronization solution is implemented as a MICROSOFT Outlook Add-in (plug-in) developed with, for example, MICROSOFT Office Tools for Developers. Communication with the external server is implemented through a custom API (Application programming interface). The API works as follows:

a. The MICROSOFT Outlook Add-in forms a list of objects that are subject to synchronization and stored in MICROSOFT Outlook. Also, for some objects, there is additional information regarding edited fields or deleting of object, as shown below:

| Obj1 | Obj2 | Obj3 | Obj4 | Obj5 | Obj8 | Obj9 |
|------|------|------|------|------|------|------|
| Field3: NewValue | | | Deleted | Field3: NewValue Field7: NewValue Field9: NewValue | New Field6: NewValue | |

"Deleted" means that the object was deleted.
"Field#: NewValue" means that in a relevant Object, the value of Fields# was changed to NewValue.
"New" means that the object was created by email client and is sent to an external server in a first time.

b. After receiving the data, the external server applies changes to objects stored on the external server. If there is a conflict (when data on the external server is different from the data in MICROSOFT Outlook), data on the external server is not changed, and an error message is sent to the MICROSOFT Outlook Add-in. The data in MICROSOFT Outlook is restored to external server values (because data on the external server is presumed to be more correct than data in MICROSOFT Outlook, although the user can reverse this presumption through add-in settings).

c. The external server forms a response to be sent to the MICROSOFT Outlook Add-in. All updated fields of changed Objects are sent, which applies to both Objects that were changed in MICROSOFT Outlook (as discussed in the previous paragraph) and Objects that were changed on the external server. Confirmation about applying the changes to objects stored on the external server is also sent to the MICROSOFT Outlook Add-in. Information about a time of a last successful synchronization is stored in the MICROSOFT Outlook Add-in, and the following information is sent by the external server to the MICROSOFT Outlook Add-in:

| Obj1 | Obj5 | Obj8 | Obj35 | Obj6333 | Obj4 |
|------|------|------|-------|---------|------|
| Field1: Value | Field1: Value | Field1: Value | Field1: Value | Field1: Value | Deleted |
| Field2: Value | Field2: Value | Field2: Value | Field2: Value | Field2: Value | |
| Field3: Value | Field3: Value | Field3: Value | Field3: Value | Field3: Value | | d. Tasks, Comments and Attachments are synced similar to Objects, so two additional lists are formed:
  i. For all comments added to all Objects
  ii. For all attachments added to all Objects In case of attaching a file in MICROSOFT Outlook Add-in, the attachment is uploaded directly to the external server and a link to this attachment is sent as a Value of the field "AttachmentLink" to the external server. In case of attaching file at the external server, a link is also sent as Value of the "AttachmentLink" field to MICROSOFT Outlook Add-in, and it downloads the file and attaches it to MICROSOFT Outlook Item. "Deleted" key word is also used to indicate that attachment was deleted.

FIG. 1 illustrates a method for synchronizing custom objects between MICROSOFT Outlook and an external server. The MICROSOFT Outlook Items 110 are standard MICROSOFT Outlook objects that are used to store all MICROSOFT Outlook entities (such as, for example mail, contacts, tasks, schedules, appointments, etc.). The MICROSOFT Outlook Items are stored in RAM for temporary storage and have associated records on the persistent storage (for example, a hard disk drive) of a computer system. In block 125, a process checks for changes in the Outlook Items.

The process of block 125 uses MICROSOFT Outlook events to register all changes made in the MICROSOFT Outlook Items. Then, if the changes are detected in block 130, the process records them to a list of changed fields in RAM in block 145. A list of fields that have been changed in the MICROSOFT Outlook Items is recorded into the "Storage Items stored in RAM" 142 which is the part of Storage Items 112. Note that only a list of changed fields is recorded (not the actual field values). The list of changed fields can be represented by an array. Note that a list of changed fields can be updated after every change in the MICROSOFT Outlook Item. A list of changed fields can be created for every MICROSOFT Outlook Item after the item will be opened. Also, a list of changed fields can be cleared or deleted for currently opened MICROSOFT Outlook Item if the user or system (for example, in case of critical error) will not save changes for this item.

Also note that a list of changed fields is optional, since changed fields can be recorded to a "Storage Items stored in RAM" 142.

The MICROSOFT Storage Items 112 are MICROSOFT Outlook objects and MICROSOFT Outlook Items that are used to store service information of applications, such as an application that is used to work with emails and such objects as Contacts, Tasks, Calendar, etc. In the exemplary embodiment, the Storage Items 112 are used to store information about the changed fields and about the saved fields (discussed below).

If new changes are not detected in block 130, the process keeps checking the Outlook Items for changes in block 125. Subsequently, the process checks for saved Outlook Items in block 115. Then, if the saved changes are detected in block 120, the process records information about the saved fields in block 135. According to the exemplary embodiment, this process uses MICROSOFT Outlook events to register the event of saving changes in the Storage Items 112.

This process records the fact that fields have been saved to the Storage Items. Technically, it means adding Boolean value to an array of changed fields stored in the Storage Items. Note that a table or a file can be used, instead of an array. In other words, after the changes will be saved, then "Storage Items stored in RAM" 142 will update "Storage Items stored on the data storage" 140 with last changes, which were made after the previous saving. So the last changes that were saved can be erased from the "Storage Items stored in RAM" 142. If new changes are not detected in block 120, the process keeps checking the Outlook Items for saving events in block 115. In block 150, the process checks for changes in the "Storage Items stored on the data storage" 140. The process continuously checks the Items 140 for information about new saved fields (that were marked as saved in block 135). Note that Storage Items can be stored in RAM or in persistent storage. When working Outlook Items, i.e., the tasks are not edited, the Storage Items need only to be stored in persistent storage (if they have already been created but not yet synced with the external server). When the Outlook Item is opened for editing, the Storage Item stored in persistent storage is copied to RAM, after which all changes to the Storage Items are done to the copy in RAM. When the user or application or system saves the changes, the persistent storage copy of the Item is updated. To sync with the external server, data about the changed fields is taken from persistent storage.

The process of the synchronization is started in step 150 and will be described below.

If new changed and saved fields are detected in block 155, the process gets the actual values for changed fields in block 160. The process reads the MICROSOFT Outlook Items and gets the actual values for the fields that were detected as saved in block 155. For each field marked as saved, the updated field value is retrieved and sent to an external server in block 165. If new saved fields are not detected in block 155, the process keeps checking the Items 140 for new saved fields in block 150.

In block 170, the process receives information about updated and new fields including values from the external server. New fields are fields that were changed, for example, by another user in another email client, or were changed via Internet browser. Also these fields can be different fields from updated fields in step 160. Then, in block 185, the process updates MICROSOFT Outlook Items with the new fields. In block 175 the process receives notifications about saving fields on the external server. This process is supported by a custom API. Subsequently, in block 180, the process updates the Items 140 with information reflecting that the fields have been successfully saved on the external server.

It means that the records about both the changed and the saved fields have been deleted from the Items 140.

Figure 2:
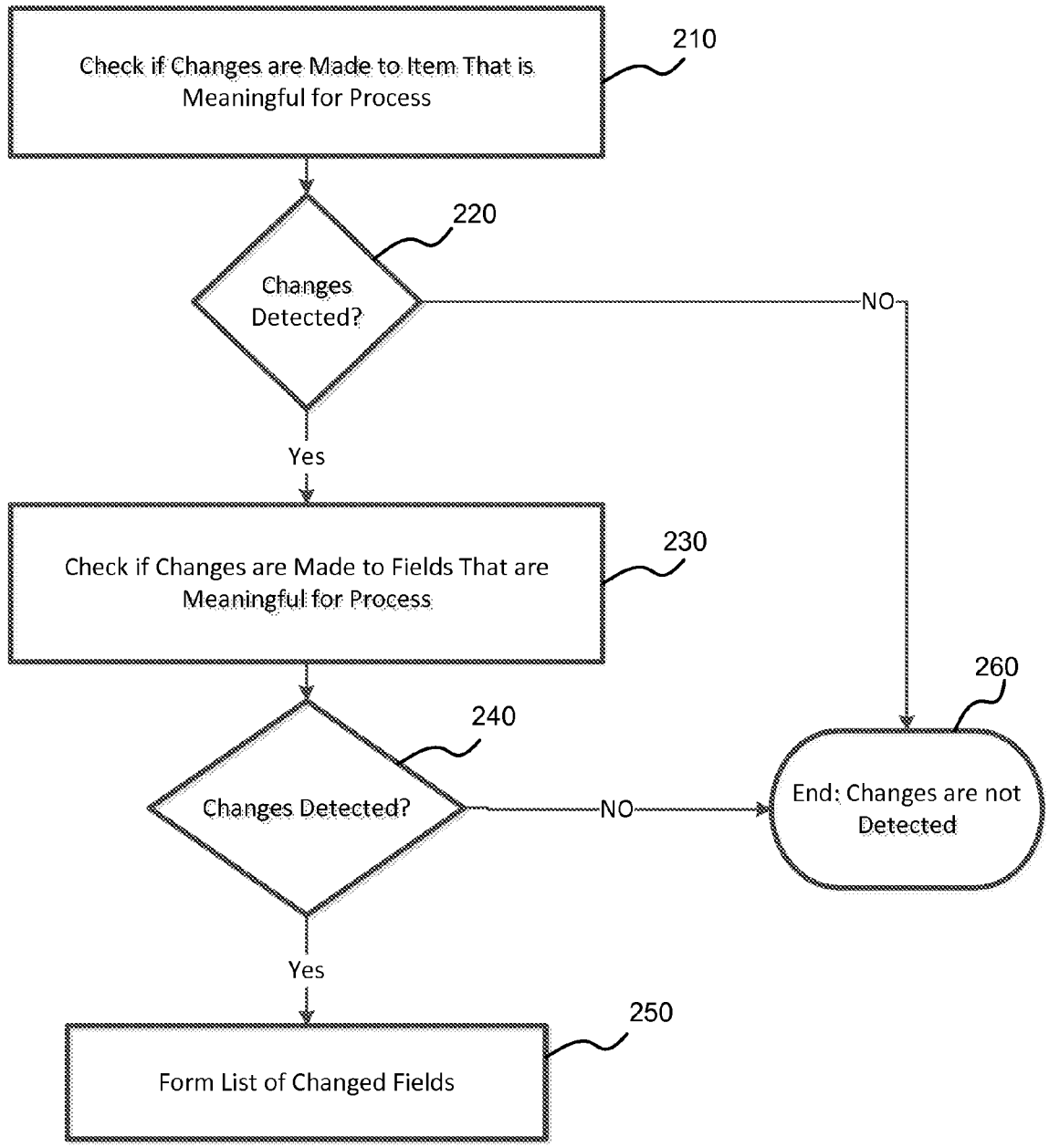
FIG. 2 illustrates a block diagram for forming a list of changed fields, in accordance with the exemplary embodiment.

FIG. 2 illustrates a block diagram for forming a list of changed fields, in accordance with the exemplary embodiment. In block 210 the synchronization application checks if the changes have been made to an item meaningful to the process. Meaningful changes, in the exemplary embodiment, are the changes that are made to a custom, or COMINDWARE, Object (named after the assignee of this application) since this object is being essentially synchronized. A COMINDWARE Object is an Object that has some Workflow behind it and is stored on the external server. COMINDWARE Objects can be, for example: Claims, Support Requests, Vacation Requests, Vacancies, Candidates, Employees, Travel Expenses Reports, Software Bugs, Feature Proposals, Insurance Applications, Purchase Orders, Medical Reports, Change Requests, Hardware Assets, Software Assets, Test Cases, Time-off Requests etc. If Custom Objects are not supported by standard email client without changes, then a Custom Object or part of it can be converted to email client items. For example, data (data from the custom objects, such as a date of the custom object creation, author of the custom object creation, etc.) can be received from the external server and recorded to email client items.

Also note that email client items or part of it can be converted to external server custom objects and can be transferred to the external server. In that form, they can be stored on the server, and the server can more easily work with them, in its own format, rather than in the format of the email client. The server can have its own format for storing the Items, including both standard Outlook items and Items not normally supported by email clients. The Custom Object manager can work with data in both the server's format and Outlook format.

Then, if changes to the meaningful items are detected in block 220, in block 230 the system checks if the changes have been made to meaningful fields. If the changes to the meaningful fields are detected in block 240, a list of changed fields is generated in block 250. So a list of changed fields ("Storage Item stored in RAM" 142) is updated with every changed meaningful field. If changes of meaningful fields are not detected in blocks 220 and 240, the process ends in block 260.

Figure 3:
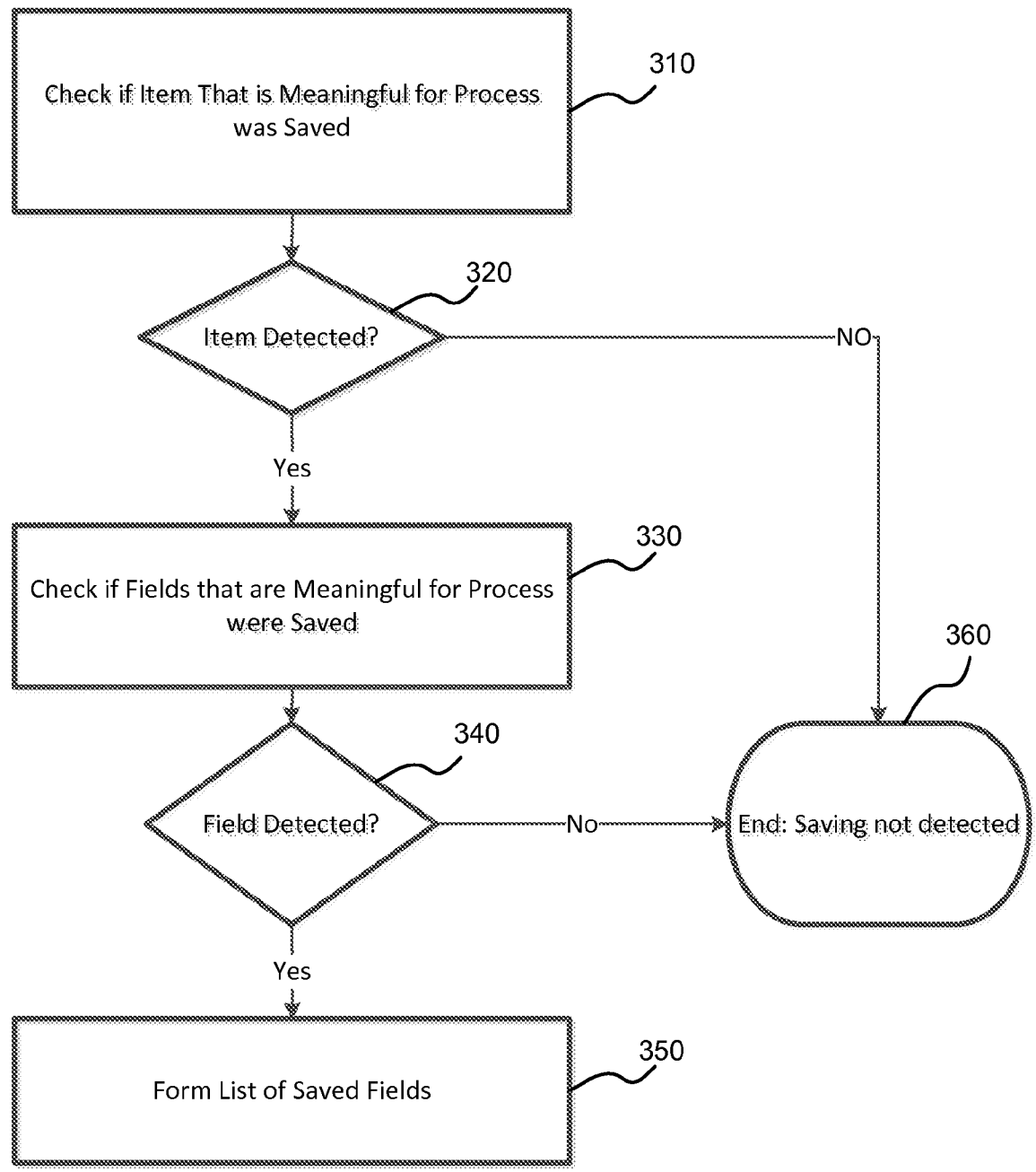
FIG. 3 illustrates a block diagram for forming a list of saved fields, in accordance with the exemplary embodiment.

FIG. 3 illustrates a block diagram for forming a list of saved fields, in accordance with the exemplary embodiment. In block 310 the synchronization application checks if the item that has been saved is meaningful to the process. Meaningful, in the exemplary embodiment, are the save events that concern COMINDWARE Object since it is being synchronized.

If saving events in the meaningful MICROSOFT Outlook Items are detected in block 320, the synchronization application checks, in block 330, if the meaningful fields have been saved. If the meaningful fields are detected in block 340, a list of saved fields is generated in block 350. A process of copying of changed fields from "Storage Item stored in RAM" 142 to "Storage Item stored on a data storage" 140 can be used for each saved field instead of creating a list of saved fields. If changes are not detected in blocks 320 and 340, the process ends in block 360.

Figure 4:
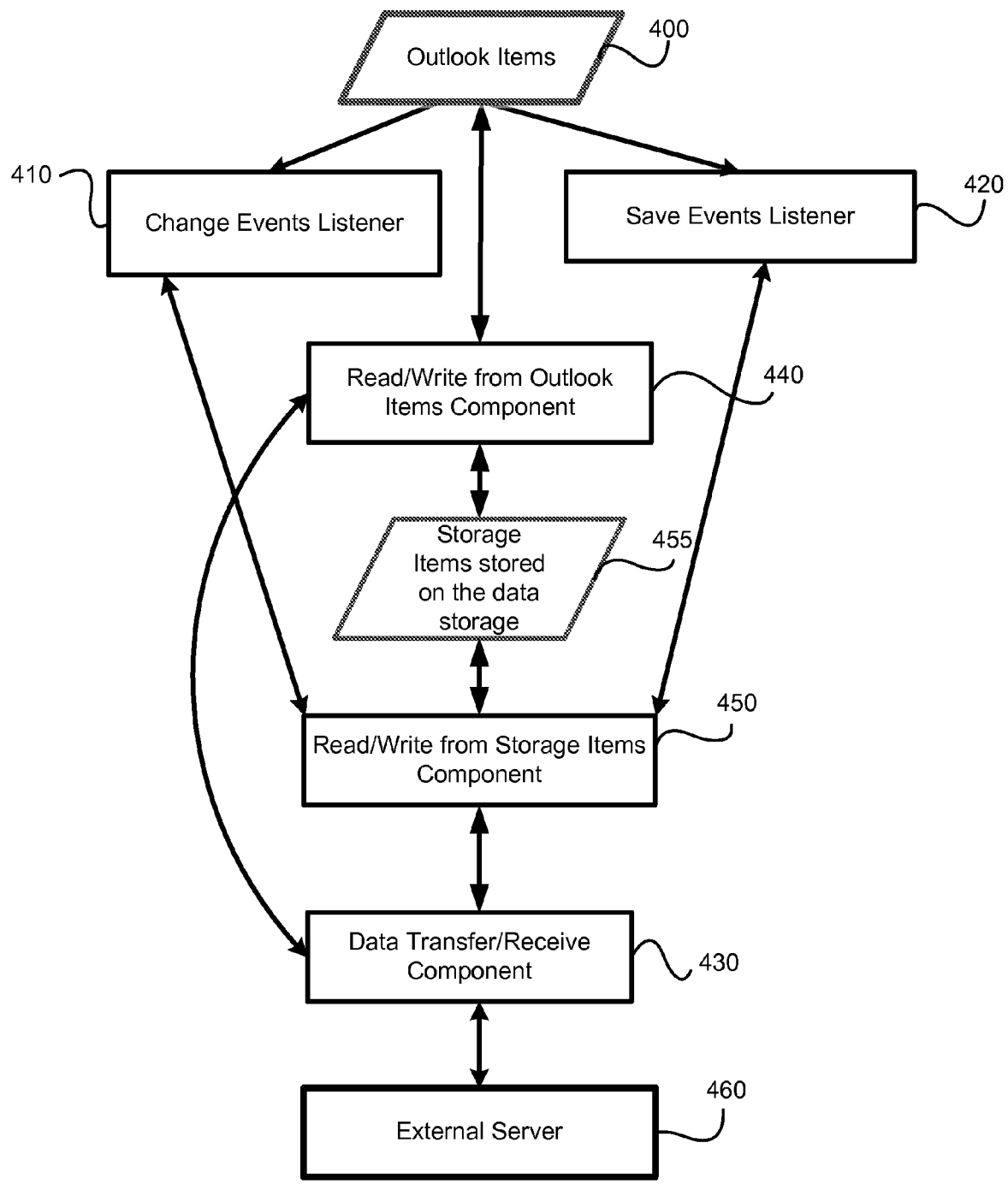
FIG. 4 illustrates system architecture, in accordance with the exemplary embodiment.

FIG. 4 illustrates system architecture, in accordance with the exemplary embodiment. A change events listener component 410 is intended to listen/track) for events that indicate changes in Outlook Items 400. A save events listener component 420 is intended to listen for events that indicate saving of the Outlook Items 400. A read/write from the Outlook Items component 440 is intended to read information from the Outlook Items 400 to check, if there were changes and then write the updated fields that are received from an external server 460.

A read/write from the Storage Items component 450 is intended to write information about changed fields and about saved fields received from the components 410 and 420 respectively. Then the component 450 reads information on both changed and saved fields from the Storage Items 455 to trigger a process of sending updated fields to extended server 460 by a data transfer/receive component 430. This component is intended to send the fields updated in the Outlook Items to an external server 460 and receive updated fields from the external server 460.

According to another exemplary embodiment, the synchronization application provides tight integration with MICROSOFT Outlook. The synchronization application (COMINDWARE Task Management) has a functionality of task manager (custom object manager) that works with tasks (custom objects). However, COMINDWARE Tasks described herein are considerably more advanced compared to standard MICROSOFT Outlook tasks. In particular, these tasks have the following additional features:

1. Discussion with hierarchy of comments posted by users;
2. History with a list of all changes made to the task;
3. Time log (i.e., estimated total time spent on the task);
4. Unlimited number of subtasks; and
5. Structured reference to other COMINDWARE Objects in the system. COMINDWARE Objects can be interrelated with each other through the use of hyperlinks. This allows to flexibly model data.

The exemplary embodiment allows users that are used to work with MS Outlook to continue working in their familiar environment. In other words, a COMINDWARE (proprietary) task manager is integrated into MICROSOFT Outlook interface using Outlook development tools. This way the advanced tasks are used in MICROSOFT Outlook. The new tasks look like typical MICROSOFT Outlook task, but are considerably broader in functionality. Users can create integrated COMINDWARE tasks, edit them, assign tasks, etc. The information is sent to COMINDWARE server (i.e., an external server synchronized with MICROSOFT Outlook).

For example, the advanced tasks can include a discussion with hierarchy of comments posted by users. Unlike native Outlook Tasks, advanced tasks have comments associated with them. Comments have a hierarchical structure, so users can post new comments or reply to other's comments. Users can edit comments they have posted. This feature provides a real-time discussion possibility within a particular task while keeping the context, which makes it much more convenient for collaboration purposes.

The advanced tasks can also have a history with a list of all changes made to a task. Each change made to a task can be seen in history in a convenient form. So the user can explore the history of all changes that have ever been made to a task. This helps solve disputed questions and/or restore unintentionally erased data.

The advanced tasks can also have a time log (time spent) reflecting a total time spent on a task. The user can log time spent on tasks in a special tab. Then, integrated reports on time spent for particular tasks can be prepared. This information is useful for billing purposes and cost analysis.

The advanced tasks can also have an unlimited number of subtasks. With subtasks the user can split the work into smaller parts and give each part to particular employee. Since the hierarchy of subtasks is unlimited, the user can manage pretty complex project with just advanced tasks. A list of all subtasks with statuses and assignees can be seen in a parent task.

The advanced tasks can also have a structured reference to other custom objects in a system. Items can be interconnected with each other for navigation, statistics and quick-getting-into-context purposes. The user can set a link from a task to any item stored on the server, and then quickly navigate using that link. Information about linked tasks will also be seen on appropriate items.

Figure 5:
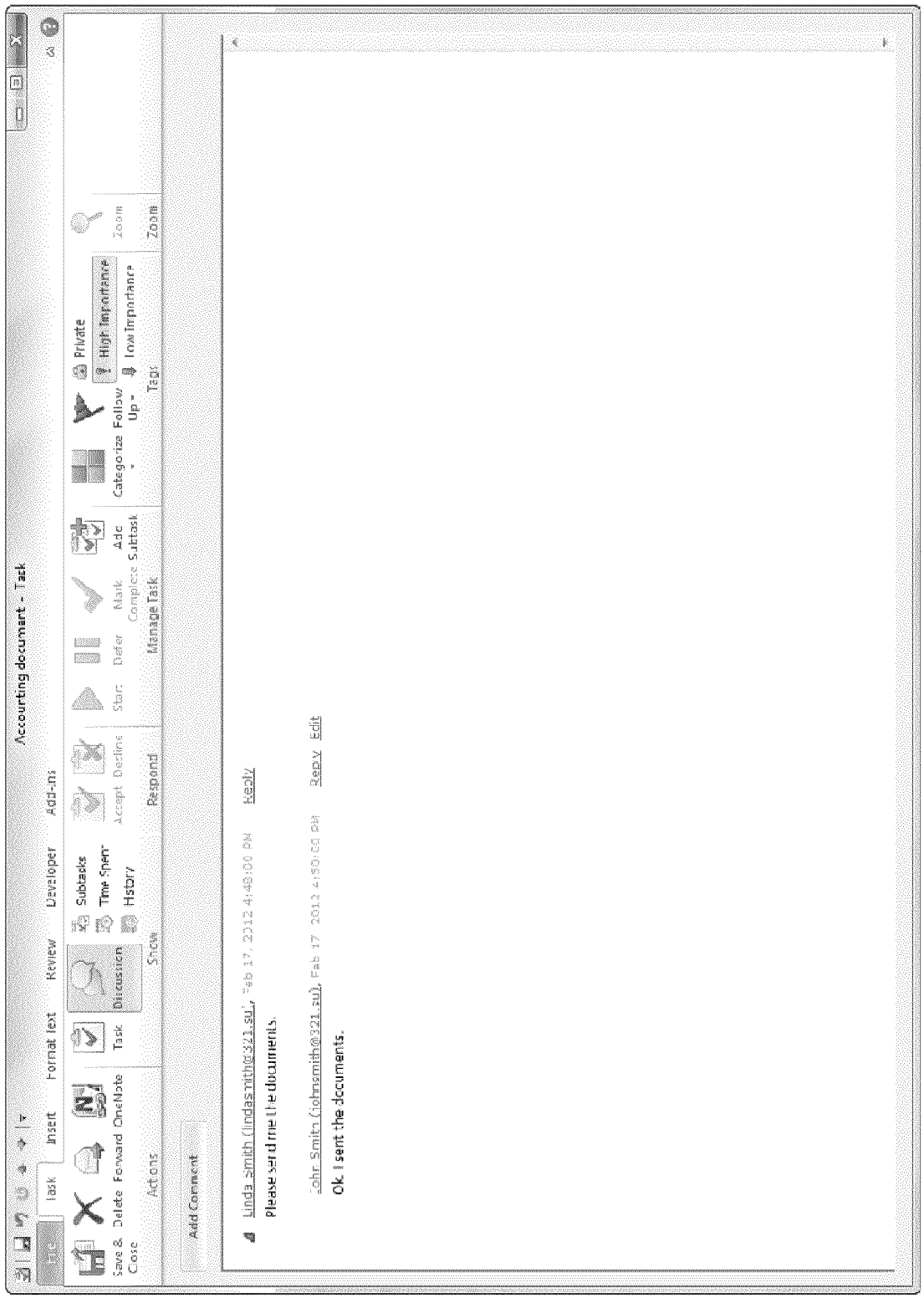
FIG. 5 illustrates a screenshot of user comments (discussion) interface, in accordance with the exemplary embodiment.
Figure 6:
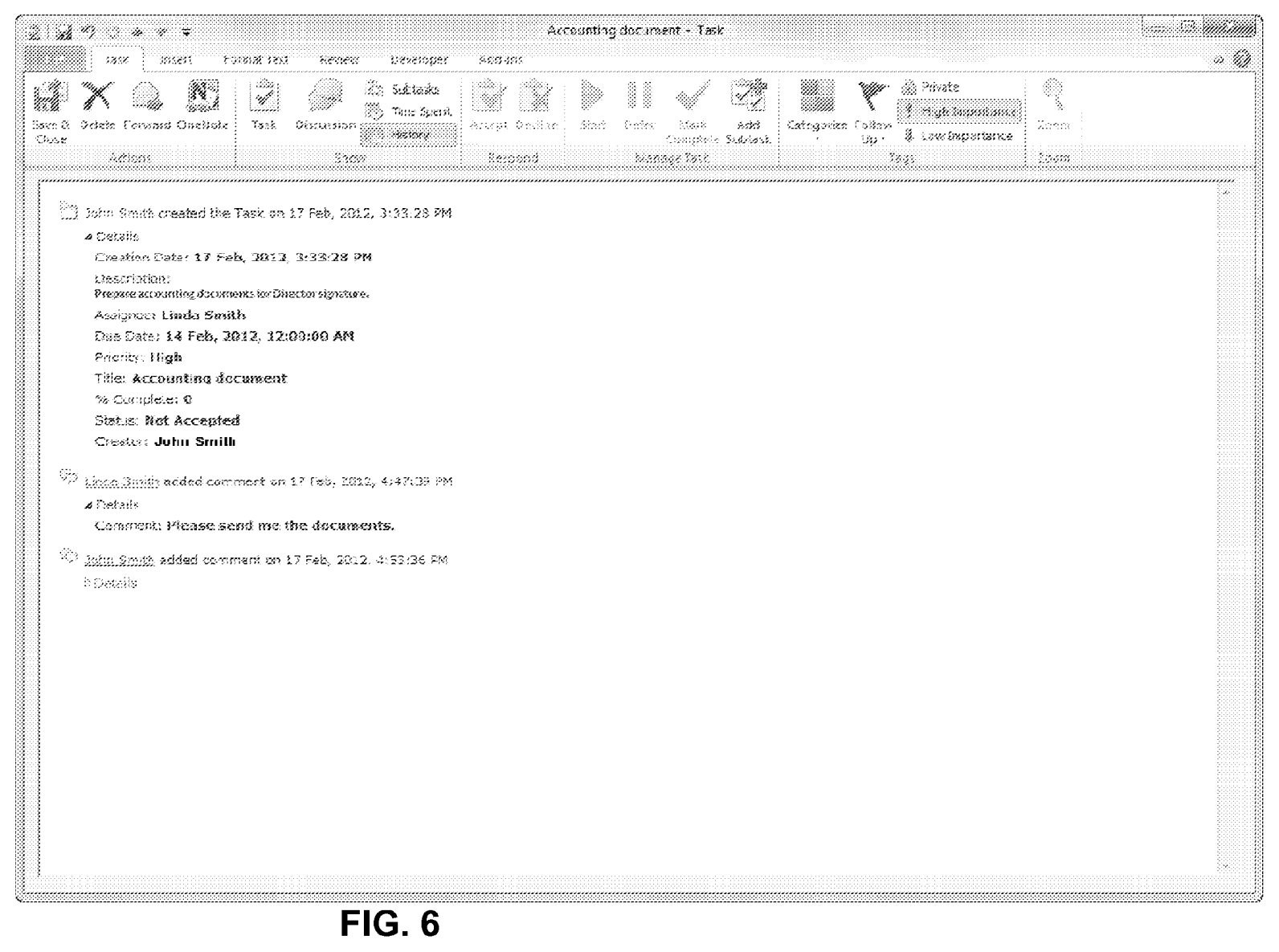
Figure 7:
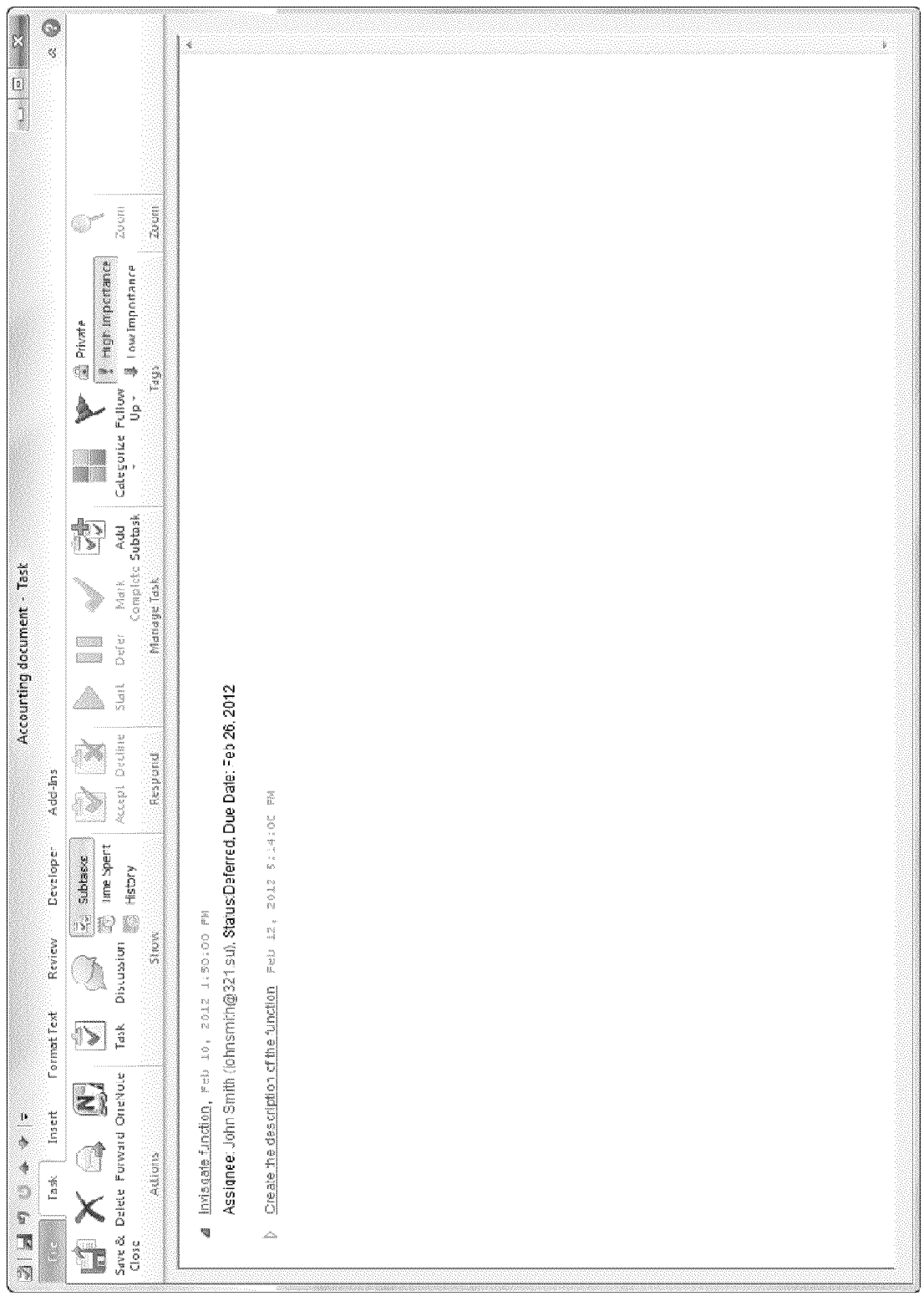
FIG. 7 illustrates a screenshot of subtasks interface, in accordance with the exemplary embodiment.
Figure 8:
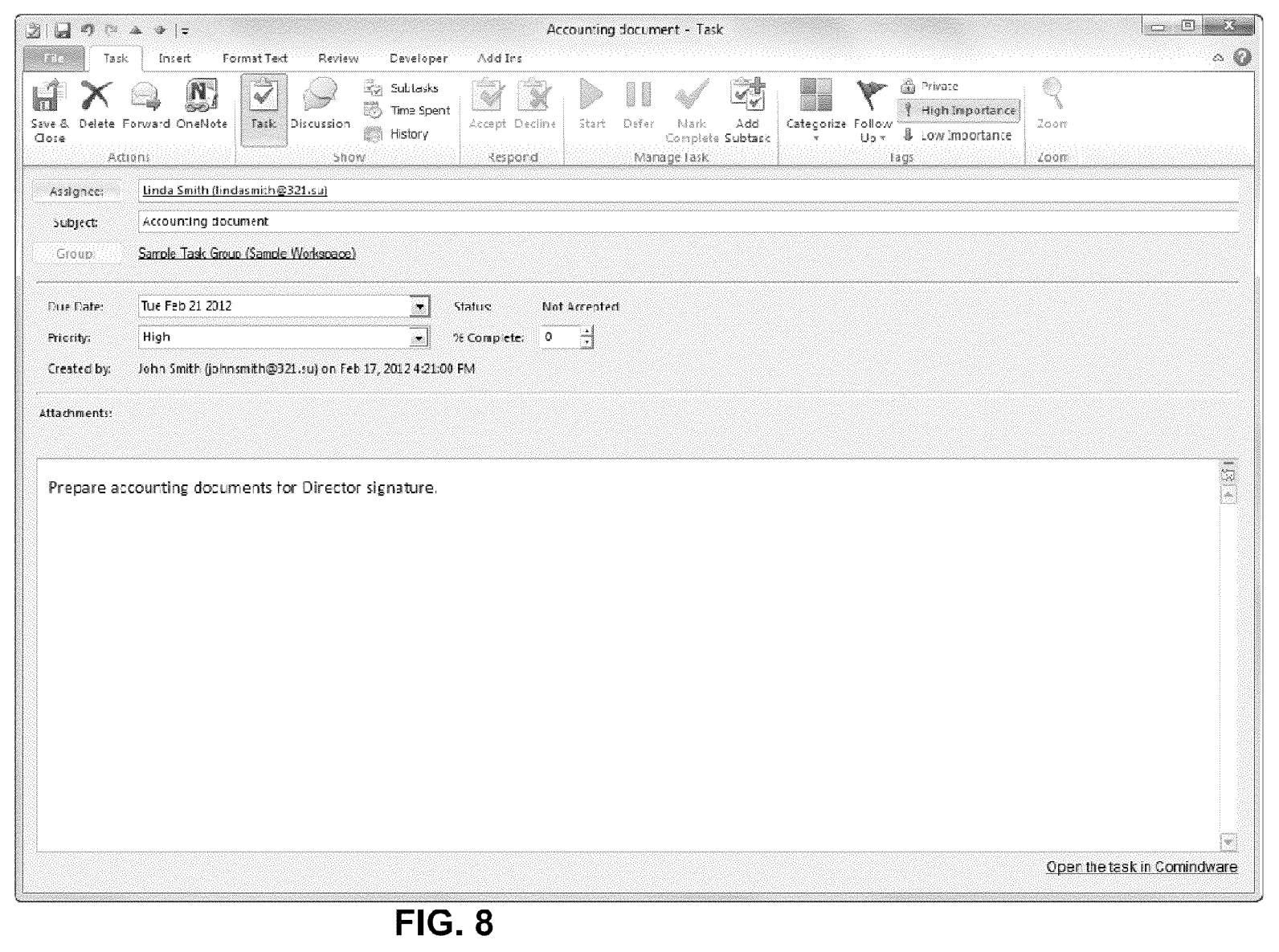

An exemplary appearance of the integrated tasks is illustrated in FIGS. 5-8. FIG. 5 illustrates a screenshot of discussion (user comments interface), in accordance with the exemplary embodiment. FIG. 6 illustrates a screenshot of history interface, in accordance with the exemplary embodiment. FIG. 7 illustrates a screenshot of subtasks interface, in accordance with the exemplary embodiment. FIG. 8 illustrates a screenshot of tasks interface, in accordance with the exemplary embodiment.

Those skilled in the art will appreciate that the proposed method and system provide for an effective two-way synchronization between MICROSOFT Outlook and an external server.

Two-way synchronization is required, since users can also work with Custom Objects with other interfaces, implemented as plugins for other software (i.e. MICROSOFT Visual Studio). The external server also provides its own web interface, and users can work with custom objects using it.

Figure 9:
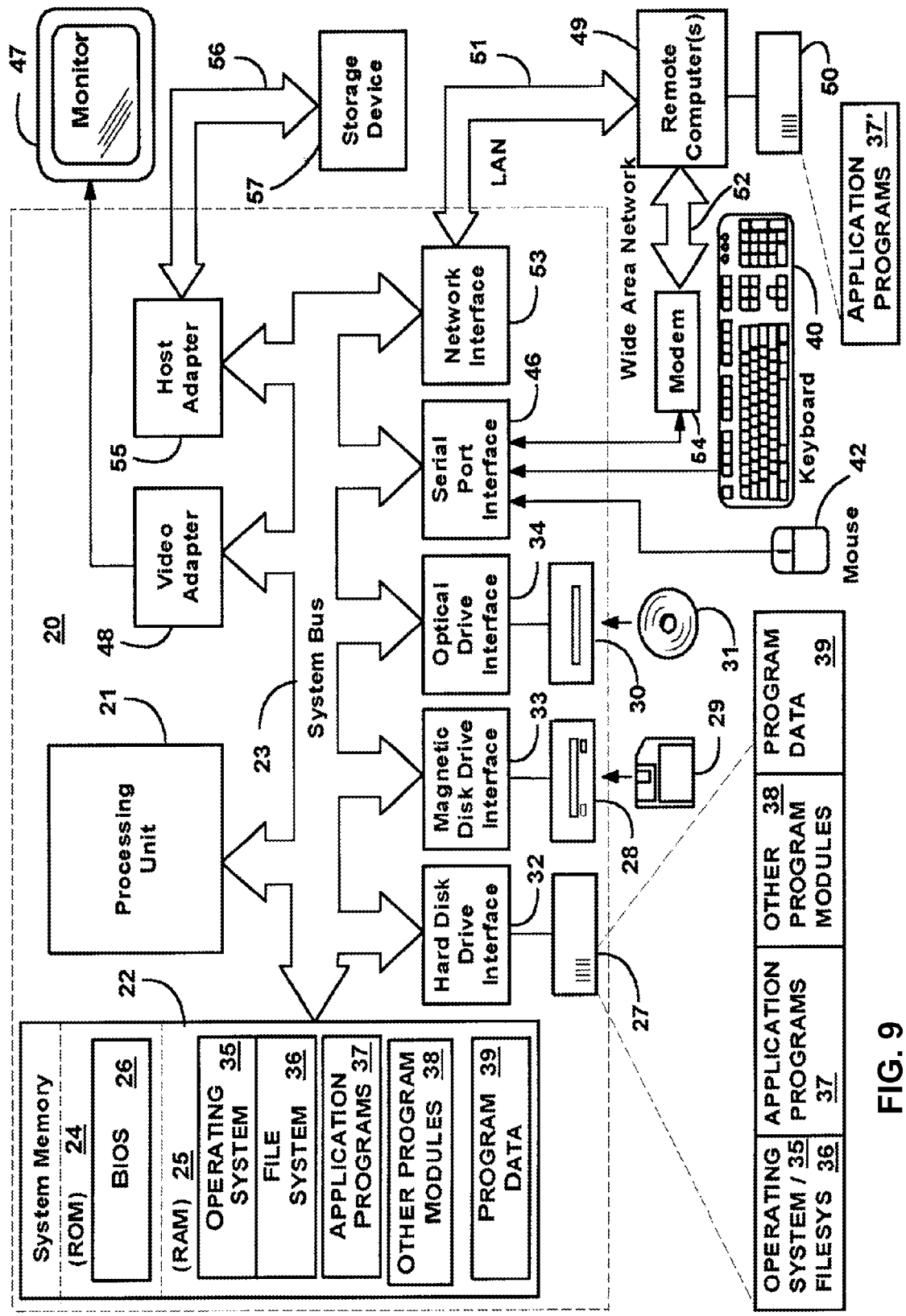
FIG. 9 illustrates a schematic of an exemplary computer system that can be used for implementation of the invention.

With reference to FIG. 9, an exemplary system for implementing the invention includes a general purpose computing device in the form of a computer 20 or a server, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented system for synchronizing custom objects between an email client and an external server, the system comprising:
   a plurality of custom objects stored on the external server, wherein the custom objects are not supported by the email client without modification, and a plurality of email client items corresponding to the custom objects and stored on the email client, wherein the custom objects are converted to standard object types supported by the email client,
   wherein the email client includes a task manager plug-in for managing workflow using the custom objects, and the custom objects include all of the following (i)-(v):
   (i) a discussion with hierarchy of comments posted by users,
   (ii) a history with a list of changes made to the custom objects,
   (iii) a time log reflecting a total time spent by the users on a custom object,
   (iv) an unlimited number of subtasks for each task, and
   (v) a structured reference to other custom objects in the email client;
   a change events listener module for detecting changes in the email client items;
   a save events listener module for detecting saves of the email client items;
   a first read/write module from the email client items for reading fields from the email client items and writing updated email client items' fields received from the external server;
   a plurality of storage items for storing information about changed fields and about saved fields;
   a second read/write module from the storage items for reading data out of the storage items and for writing data reflecting the changed fields and the saved fields into the storage items; and
   a data transfer/receive component for synchronizing custom object fields between the email client and the external server,
   wherein the data stored in the storage items are received from the change events listener module and from the save events listener module, and
   wherein the data stored in the email client items are read and written based on the storage items.

2. The system of claim 1, wherein email client is any of MICROSOFT Outlook and Lotus Notes.

3. The system of claim 1, wherein the email client items are any of:
   mail messages;
   contacts;
   tasks;
   meetings; and
   appointments.

4. The system of claim 1, further comprising a custom object manager integrated in the email client for managing non-standard advanced custom objects that email client does not support without modification.

5. A computer-implemented method for synchronizing custom objects between email client and an external server, the method comprising:
   (a) checking for changes in email client items, wherein the email client items include standard objects supported by the email client and the custom objects that are not supported by the email client without modification, and wherein the custom objects are converted to standard object types supported by the email client,
   wherein the email client includes a task manager plug-in for managing workflow using the custom objects, and the custom objects include all of the following (i)-(v):
   (i) a discussion with hierarchy of comments posted by users,
   (ii) a history with a list of changes made to the custom objects,
   (iii) a time log reflecting a total time spent by the users on a custom object,
   (iv) an unlimited number of subtasks for each task, and
   (v) a structured reference to other custom objects in the email client;
   (b) recording a list of changed fields of the email client items, if changes are detected;
   (c) checking for save events in the email client items;
   (d) writing the list of changed fields into the storage items;
   (e) checking for changes in the storage items;
   (f) acquiring actual field values from the email client items, if the changes are detected;
   (g) sending the actual field values to an external server;
   (h) receiving update notifications from the external server;
   (i) updating the storage items;
   (j) receiving fields updated at the external server and new fields from the external server;
   (k) updating the email client items with the received fields; and
   (l) repeating steps (a)-(k).

6. The method of claim 5, wherein email client items includes custom objects, which are not supported by a standard email client without modification.

7. The method of claim 5, further comprising checking whether changes are made to an item that is meaningful for a process.

8. The method of claim 7, further comprising forming a list of changed fields of the email client items, and list consist of meaningful changed fields.

9. The method of claim 5, further comprising checking whether changes made to the item meaningful for the process are saved.

10. The method of claim 9, further comprising forming a list of saved fields of the email client items, wherein the list consists of meaningful changed fields.

11. The method of claim 5, further comprising integrating a custom objects manager into the email client for managing the custom objects.

12. A system for synchronizing objects between email client and an external server, the system comprising:
- a processor;
- a memory coupled to the processor;
- a computer program logic stored in the memory and executed on the processor, the computer program logic for implementing the steps of claim 5.

* * * * *